ELECTRIC SIGNAL REPEATER CIRCUITS

INVENTORS
GEORGE MITCHELL SMITH
DONALD JACK CLEOBURY
BY Kerchner, Kerchner & O'Kilger
ATTORNEYS

ELECTRIC SIGNAL REPEATER CIRCUITS

INVENTORS
GEORGE MITCHELL SMITH
DONALD JACK CLEOBURY
BY
Kimberley, [signature]
ATTORNEYS

ELECTRIC SIGNAL REPEATER CIRCUITS

Filed June 29, 1965 3 Sheets-Sheet 3

INVENTORS
GEORGE MITCHELL SMITH
DONALD JACK CLEOBURY
BY Kinchelow, Kushelow & Offenger ATTORNEYS United States Patent Office 3,392,242
Patented July 9, 1968

3,392,242

ELECTRIC SIGNAL REPEATER CIRCUITS

George Mitchell Smith, Coventry, and Donald Jack Cleobury, Burton-on-Trent, England, assignors to The General Electric Company Limited, London, England Filed June 29, 1965, Ser. No. 468,034
Claims priority, application Great Britain, July 1, 1964, 27,165/64
11 Claims. (Cl. 179—175.31)

This invention relates to electric signal repeater circuits, that is, to amplifying and regenerating circuits interposed at intervals in a transmission line to boost the transmitted signal. The invention is particularly concerned with four-wire repeaters, that is, repeaters having two amplifiers, for operation in respective ones of two opposite directions.

It is an advantage to be able to check the operation of such repeater circuits from one terminal of the line and it is thus an object of the present invention to provide a repeater circuit affording such a facility.

According to one aspect of the present invention a line repeater circuit comprises respective amplifying means for amplifying signals being transmitted in each of two opposite directions, switching means arranged when operated to supply an output signal from one of said amplifying means to the other amplifying means for further amplification, the direction of transmission of said signal thus being reversed, and means arranged to respond to a control signal to operate said switching means, the arrangement being such that when said switching means is operated the repeater circuit is connected to return normal signals received by said one amplifying means to their source and to inhibit the normal input signal to said other amplifying means.

The means arranged to respond to a control signal preferably comprise a frequency selective circuit arranged to respond to an audio signal of predetermined frequency received by the repeater circuit. Alternatively the control signal may be a predetermined pulse signal received at an input of the repeater. The means arranged to respond to a pulse signal preferably comprise means for extracting a single frequency audio signal from the pulse signal and supplying the audio signal to a frequency selective circuit arranged to operate said switching means. The means for extracting a single frequency audio signal from the pulse signal may comprise rectifying means, the arrangement being such that said audio signal can be extracted from a pulse signal which comprises bursts of pulses each burst comprising alternate positive and negative going pulses of equal height. A full wave rectifier circuit may be connected across an output of the repeater circuit to provide an output signal, on receiving said pulse signal, having a component of frequency equal to the repetition frequency of the bursts of pulses.

According to another aspect of the invention a signalling system includes a terminal station, a transmission line and a plurality of repeater circuits interposed at intervals in the line, a source of constant frequency signals at said terminal station, the source being adapted to transmit selectively one of said signals along the line as a phantom signal, each repeater circuit having a frequency selective circuit arranged to respond to one of said signals, the frequency of said one being characteristic of the particular repeater circuit, and operate the switching means of the particular repeater circuit accordingly.

According to a further aspect of the invention, a signalling system includes terminal station, a transmission line and a plurality of repeater circuits interposed at intervals in the line, a pulse signal source at the terminal station, the source being adapted to transmit a pulse signal along the line having an audio-frequency modulation characteristic of one of said repeater circuits which has a frequency selective circuit arranged to respond to said audio frequency modulation and operate the switching means of the one repeater circuit accordingly. In this case the source may be adapted to transmit selectively a plurality of pulse signals each comprising bursts of pulses and each burst comprising alternate positive and negative going pulses of equal height, the pulse signals having different audio-frequency burst-repetition rates characteristic of respective ones of the repeater circuits, the arrangement being such that the pulse signals are transmitted as normal intelligence signals of the system, being amplified at those repeater circuits of which their burst-repetition rates are not characteristic.

A telephone repeater circuit and a modification thereof, both according to the invention, will now be described, by way of example, with reference to the accompanying drawings of which:

Figure 1:
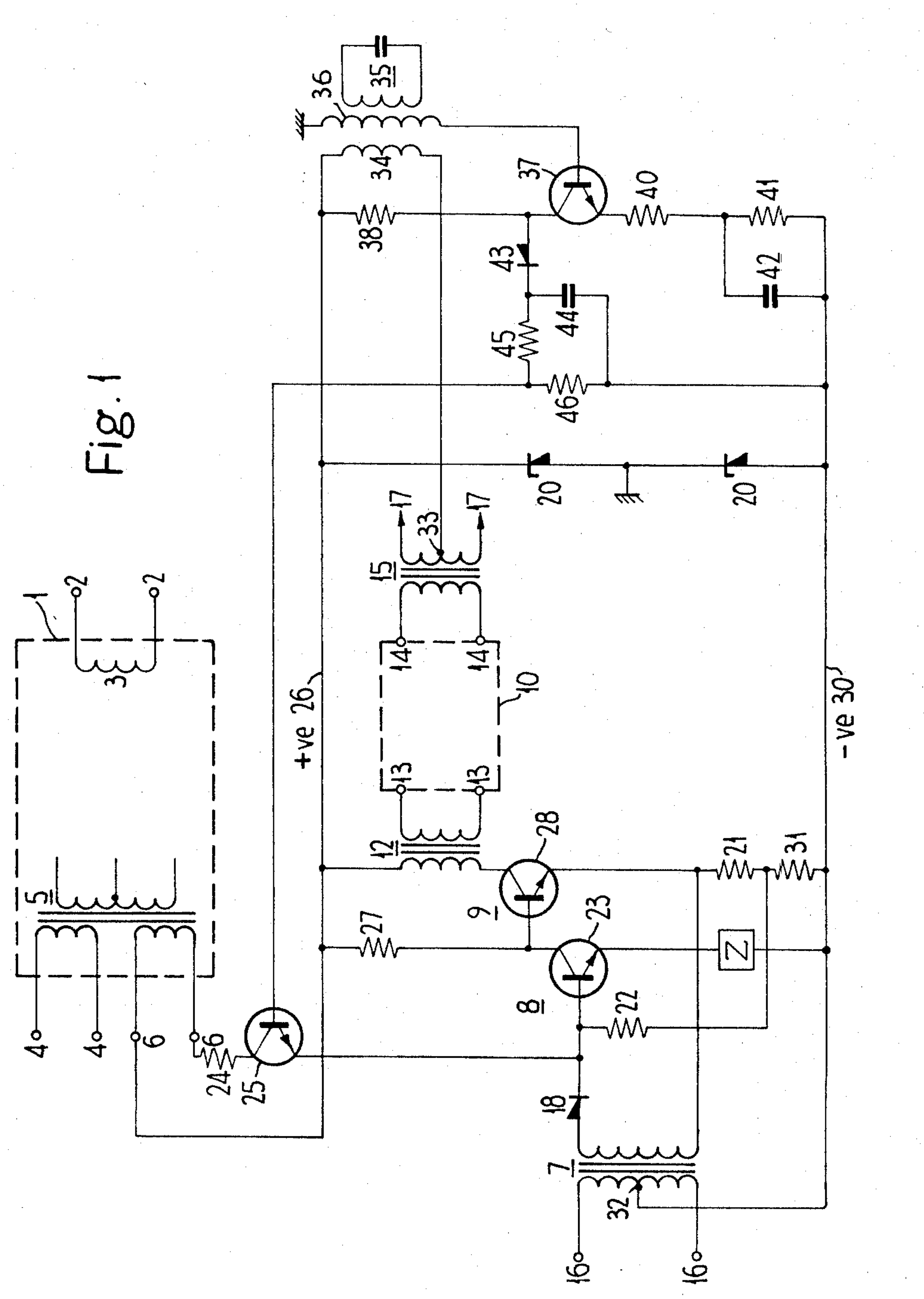
FIGURE 1 is a partly schematic circuit diagram of a four-wire repeater.
Figure 3:
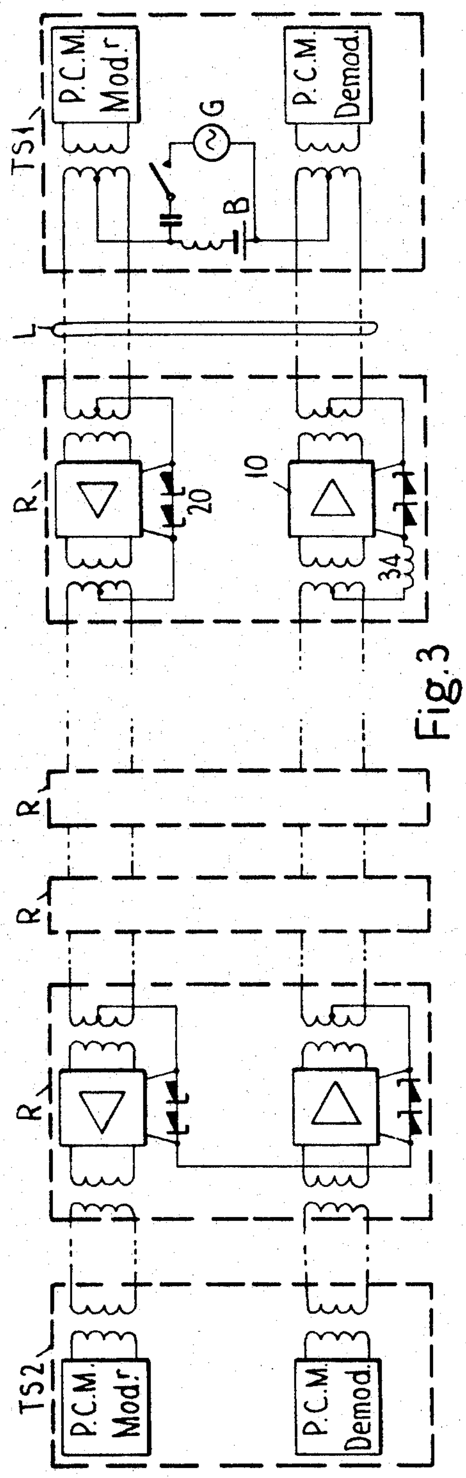
FIGURE 3 is a partly schematic circuit diagram of a line signalling system incorporating repeater circuits according to FIGURE 1.

Referring to FIGURES 1 and 3 of the drawing the system comprises a terminal station TS1, from which tests are to be made, and a terminal station TS2, at the ends of a four-wire transmission line L.

Each terminal station has a pulse-code-modulation modulator and demodulator for transmission and reception of pulse-coded signals. A number of repeater circuits R are interposed in the line at intervals, each of these circuits being such as that shown in FIGURE 1.

The repeaters are supplied with D.C. power, from a source B at the terminal station TS1, over a phantom circuit comprising the two forward-transmission wires in parallel, the two return-transmission wires in parallel, the two pairs then being connected in series. Continuity of the power supply through the various repeaters is effected by connections between centre taps (32 and 33 in FIGURE 1) of the input and output transformers of each repeater. This connection is made through two Zener diodes 20 which thus provide a local fixed potential-difference for driving the repeater amplifier. The interconnection of the diodes 20 provides a local datum potential or "earth".

Connected across the D.C. source B and isolated from it is an audio frequency generator G which may be switched into series connection with the phantom circuit. In each repeater circuit R one of the D.C. interconnections between transformer centre-taps include a series winding 34 which is part of a circuit tuned to an audio frequency characteristic of the particular repeater. By selecting a suitable frequency of oscillation of the generator G a control voltage can be developed in any selected repeater.

Referring now particularly to FIGURE 1, the amplifier for forward transmission of signals from terminal station TS1 is shown schematically, referenced 1. The input terminals 2 for this amplifier are shown simply connected to an input transformer winding 3. The normal output terminals 4 are connected to one output winding of a transformer 5, while another output winding of transformer 5 is connected to output terminals 6. For the return direction of transmission, that is, towards terminal station TS1, the amplifier includes an input transformer 7 supplying amplifying stages 8 and 9, transformer 12 and subsequent amplifying stages 10 shown schematically between terminals 13 of transformer 12 and terminals 14 of transformer 15. Terminals 16 of transformer 7 constitute normal input terminals for the "return" amplifier and terminals 17 constitute the normal output terminals.

Any normal input signal supplied to terminal 16 of the return amplifier is controlled by a gate circuit connected to the secondary winding of transformer 7 and comprising a diode rectifier 18, resistor 21 and resistor 22. The diode is connected in series between the secondary winding of transformer 7 and the base electrode of the n-p-n transistor 23 of stage 8. The direction of forward conduction of the diode 18 is towards the transistor 23.

Between the diode 18 and base electrode of transistor 23 is connected the emitter electrode of a transistor 25. The collector electrode of this transistor 25 is connected by means of a resistor 24 to one terminal 6 of the output winding of transformer 5 of the forward amplifier 1. The other terminal 6 of this output winding, which it will be recalled is not the normal output winding of amplifier 1, is connected to the D.C. positive line 26 for the return amplifier. Thus, when the transistor 25 is fully conducting, the resistor 24 is directly connected, (D.C.-wise), between the positive line 26 and diode 18.

Also connected to the junction of the diode 18 and transistor 23 is one terminal of the resistor 22 the other terminal of which is connected to a point in a potential divider chain formed by the amplifying stage 9.

Transistor 23 has its collector electrode connected to the positive line 26 by way of a load resistor 27, the output connection from this transistor being taken to the base electrode of n-p-n transistor 28 of amplifying stage 9. The primary winding of transformer 12 is connected in series in the collector lead of transistor 28 which lead is thereby connected to the positive line 26. The emitter electrode of transistor 28 is connected to the D.C. negative line 30 by way of two resistors 21 and 31 in series The secondary winding of transformer 7 is connected at one end to the diode 18, and at the other end to the junction of the emitter electrode of transistor 28 and resistor 21. Resistor 22 is connected between the base electrode of transistor 23 and the junction of resistors 21 and 31 and therefore provides a measure of negative feedback between stages 8 and 9.

Resistor 21, which constitutes part of the aforementioned gate circuit, provides a forward bias for the diode rectifier 18 by way of the resistor 22 and secondary winding of transformer 7. It can be seen that, in order for this forward bias to be effective, the potential difference across resistor 21 must exceed that across resistor 22.

The negative line 30 is connected to, and derives its potential from, a centre tap 32 on the primary winding of transformer 7. The positive line 26 is similarly connected to the centre tap 33 of the output transformer 15.

Connected in series with the positive line 26 and centre tap 33 of transformer 15, is the winding 34 (shown in FIGURE 3 also) which is coupled to tuned circuit 35 and to an output winding 36. The winding 36 is connected at one end to the local earth and at the other end to the base electrode of a transistor 37. The collector electrode of this transistor 37 is connected to the positive line 26 by way of a load resistor 38 and the emitter electrode is connected to the negative line 30 by way of resistors 40 and 41 and the decoupling capacitor 42.

An output connection is made between the collector electrode of transistor 37 and a diode rectifier 43. The rectified output from transistor 37 is applied to capacitor 44 which is provided with a leak comprising resistors 45 and 46. The junction of resistors 45 and 46 is connected to the base of transistor 25 which is thus supplied with a proportion of the average voltage across the capacitor 44.

In operation, signals in the forward direction of transmission will be applied to terminals 2 of the forward amplifier 1, be amplified and produced as a normal output at the terminals 4 for further transmission. An output signal will also appear at the terminals 6 but will be ineffective unless transistor 25 is conducting. In the return direction of transmission, normal input signals applied to the terminals 16 of transformer 7 will be supplied to stages 8 and 9 and subsequent amplifying stages 10 as long as the diode 18 remains conducting. While no audio tone of frequency equal to the tuned frequency of the circuit 35 is applied to the terminals 17 from the terminal station TS1 the junction of resistors 45 and 46 will have the negative line potential and the emitter-collector path of transistor 25 will be non-conducting. There will consequently be no potential drop across resistor 22 due to any current from transistor 25 and resistor 24. The potential drop across resistor 21 will therefore provide a forward bias for the diode 18 which will then pass any normal input signal to the terminals 16. Both forward and return amplifiers will then operate normally, input signals being applied at the terminals 2 and 16 and corresponding output signals being developed at terminals 4 and 17.

When, however, an audio tone of frequency equal to that of the tuned circuit 35 is applied to the phantom circuit from the source G, a substantial voltage is developed across the winding 34 and a corresponding voltage developed across the winding 36. This signal is amplified by transistor 37, the output is rectified by diode 43 and developed across capacitor 44 and the resistor combination 45 and 46. The junction of these resistors has then a substantial positive potential—with respect to the negative line 30—and the transistor 25 is "bottomed." A substantial current is then drawn through the path containing the transformer 5 secondary winding transistor 25, resistors 24, 22 and 31. The potential drop across resistor 22 is increased and the diode rectifier 18 is reverse biassed so inhibiting any normal input signal from transformer 7.

In addition the output signal from terminals 6 of transformer 5 is applied to the base electrode of transistor 23 and then amplified to appear at the output terminals 17 for transmission back to the terminal station TS1.

It can be seen that a feature of this embodiment is the manner of supply of the control signal i.e. the audio tone, on the power feeding phantom circuit. The control signal is therefore supplied to all the repeaters in series but bypasses the main amplifier stages of the repeaters.

Figure 2:
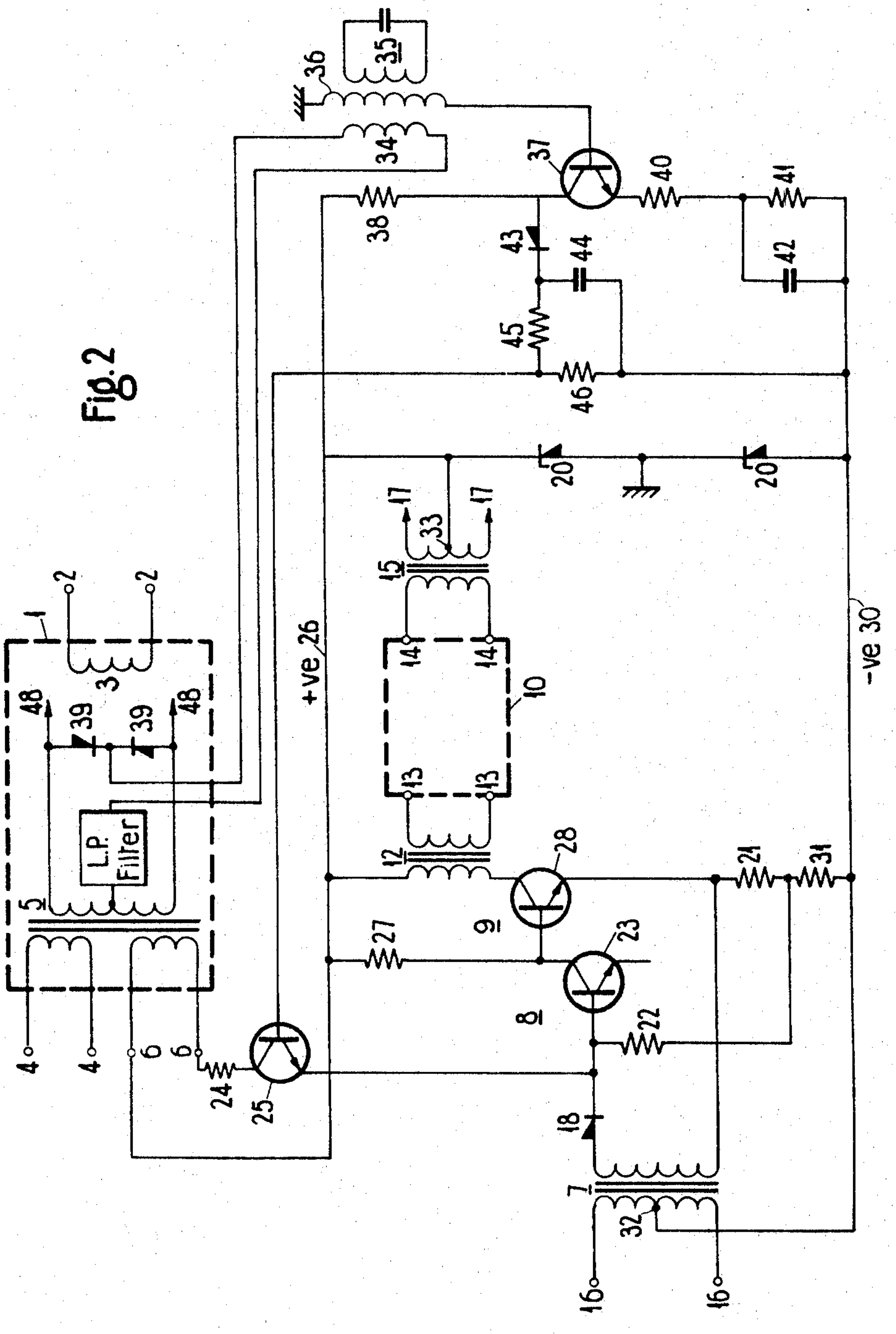
FIGURE 2 shows a modification of FIGURE 1.
Figure 4:
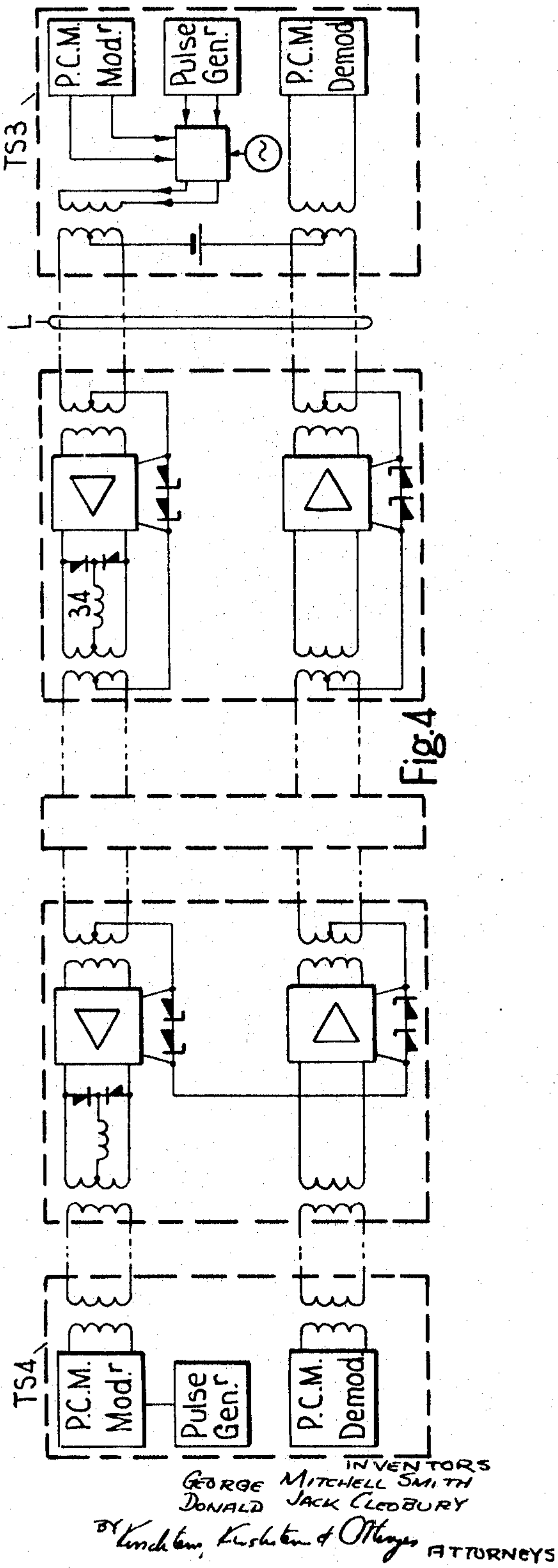
FIGURE 4 is a partly schematic circuit diagram of a line signalling system incorporating repeater circuits according to FIGURE 2.

Referring now to FIGURES 2 and 4, FIGURE 2 shows a modification of the control-signal receiving circuitry. In this modification the control signal as transmitted is not an audio signal as before but is a pulse signal of similar form—pulse width and frequency—to the main intelligence signal that is normally transmitted, i.e. a P.C.M. signal.

The terminal station TS3 therefore includes means for substituting a control pulse-signal for the normal intelligence pulse-signal. Also included in the terminal station is an audio-frequency generator which modulates the basic pulse signal of the system to provide the control signal. The form of this control signal is of bursts of pulses, each burst comprising a group of regular alternate polarity pulses having a repetition rate equal to the basic pulse repetition rate of the system, and the bursts occurring at the frequency of the audio generator. As the D.C. levels of those parts of the signal between the bursts equal the average pulse height there will be no audio frequency component of the transmitted signal although it will have the audio frequency feature (burst-repetition rate) described. It may therefore be transmitted as a normal intelligence signal and be amplified at each repeater stage.

The present invention is primarily for use in a pulse-code-modulation communication system in which the transmitted signal comprises cycles or frames of twenty-four groups of pulses, each group comprising seven digit pulses representing coded sample of information and an eighth pulse for synchronising and signalling purposes. The transmitted signal is in all circumstances required to carry information as to the basic pulse repetition rate of the system to enable the frequency of local oscillators in the system to be synchronised. The control signal employed for FIGURES 2 and 4 therefore comprises periods (bursts of pulses) in which all seven of the "code digits" are transmitted, interlaced with equal periods in which only one of the seven is transmitted, the cycle of the pattern occurring at a selected audio frequency.

In operation the pulse control signal is received at the terminals 2, not in parallel as before, but as a voltage across the terminals of alternating polarity according to the pulse alternation. Two diodes 39 are connected in series opposition across terminals 48 as a full wave rectifier, the interconnection of the diodes 39 being connected to a low pass filter 47 and the winding 34. The signal supplied to the filter 47 thus has a component at audio frequency and this is extracted by the filter 47 and supplied to coil 34 of the tuned circuit 34, 35 and 36. If the extracted audio frequency is the resonant frequency of the circuit 34, 35 and 36, i.e. the characteristic frequency of the repeater, then the amplifier stage 37 is operated as in the previous embodiment.

We claim:

1. A line repeater circuit comprising two amplifying means connected for operation in opposite transmission directions in a line, switching means connected between the output of one of said amplifying means and the input of the other, gating means connected to said input to control normal input signals to said other amplifying means, the gating means being bypassed by said switching means, and means responsive to a control signal transmitted along the line and connected to said switching means and said gating means to close said switching means and open said gating means so that a signal being transmitted by said one amplifying means is returned by the other amplifying means.

2. A line repeater circuit according to claim 1 wherein said switching means comprises a transistor having an emitter-collector path connected in series between the output of said one amplifying means and the input of said other amplifying means.

3. A line repeater circuit according to claim 2, wherein said gating means is connected to said switching means for control according to the state of conduction of said emitter-collector path.

4. A line repeater circuit according to claim 3, wherein said other amplifying means has an input transformer and wherein said gating means comprises a diode rectifier, and biassing means connected to forward bias the diode rectifier in the absence of said control signal, the diode rectifier being connected in series with the secondary winding of said input transformer.

5. A line repeater circuit according to claim 4, wherein said gating means comprises a resistor connected in series with the emitter-collector path of said transistor and providing a potential difference biassing the diode rectifier.

6. A line repeater circuit according to claim 1 wherein said means responsive to a control signal comprises a frequency selective circuit directly responsive to a signal received by the repeater.

7. A line repeater circuit according to claim 1, wherein said means responsive to a control signal comprises means for demodulating a frequency modulated pulse signal received by the repeater and a frequency selective circuit responsive to a signal of the modulation frequency, the output of the frequency selective circuit being connected to said switching means.

8. A line repeater circuit according to claim 7, wherein said means for demodulating a frequency modulated pulse signal comprises a full wave rectifier connected across an output of the repeater.

9. A signalling system comprising a transmission line, a plurality of repeater circuits, each according to claim 1, interposed at intervals in the line, a source of constant frequency signals at said terminal station, means to transmit selectively one of said signals along the line as a phantom signal, each repeater circuit having a frequency selective circuit connected to respond to one of said signals, the frequency of said one signal being characteristic of the particular repeater circuit, by operating the switching means of the repeater circuit.

10. A signalling system comprising a terminal station, a transmission line, a plurality of repeater circuits each according to claim 1, interposed at intervals in the line, a pulse signal source at said terminal station, said source being adapted to transmit a pulse signal along the line having an audio-frequency modulation characteristic of one of said repeater circuits, said one repeater circuit having a frequency selective circuit arranged to respond to said audio frequency modulation and operate the switching means of said one repeater circuit accordingly.

11. A signalling system according to claim 10 wherein said source is adapted to transmit selectively a plurality of pulse signals each comprising bursts of pulses and each burst comprising alternate positive and negative going pulses of equal height, the pulse signals having different audio-frequency burst-repetition rates characteristic of respective ones of the repeater circuits, the pulse signals being transmitted as normal intelligence signals of the system, being amplified at those repeater circuits of which their burst-repetition rates are not characteristic.

No references cited.

KATHLEEN H. CLAFFY, *Primary Examiner.*

A. A. McGILL, *Assistant Examiner.*